Figure 12:
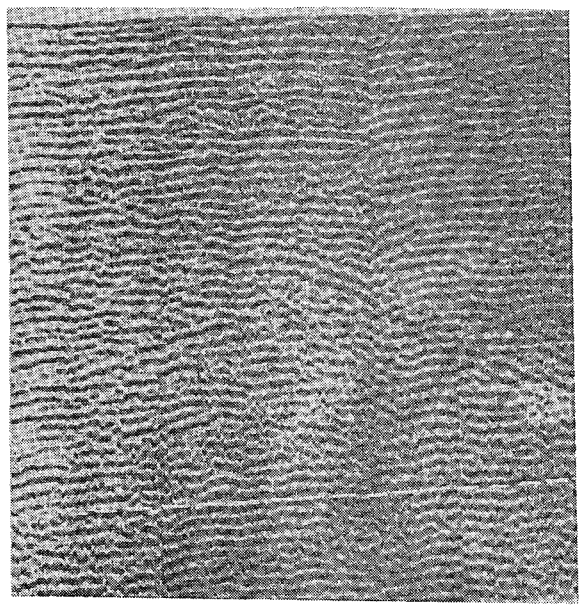

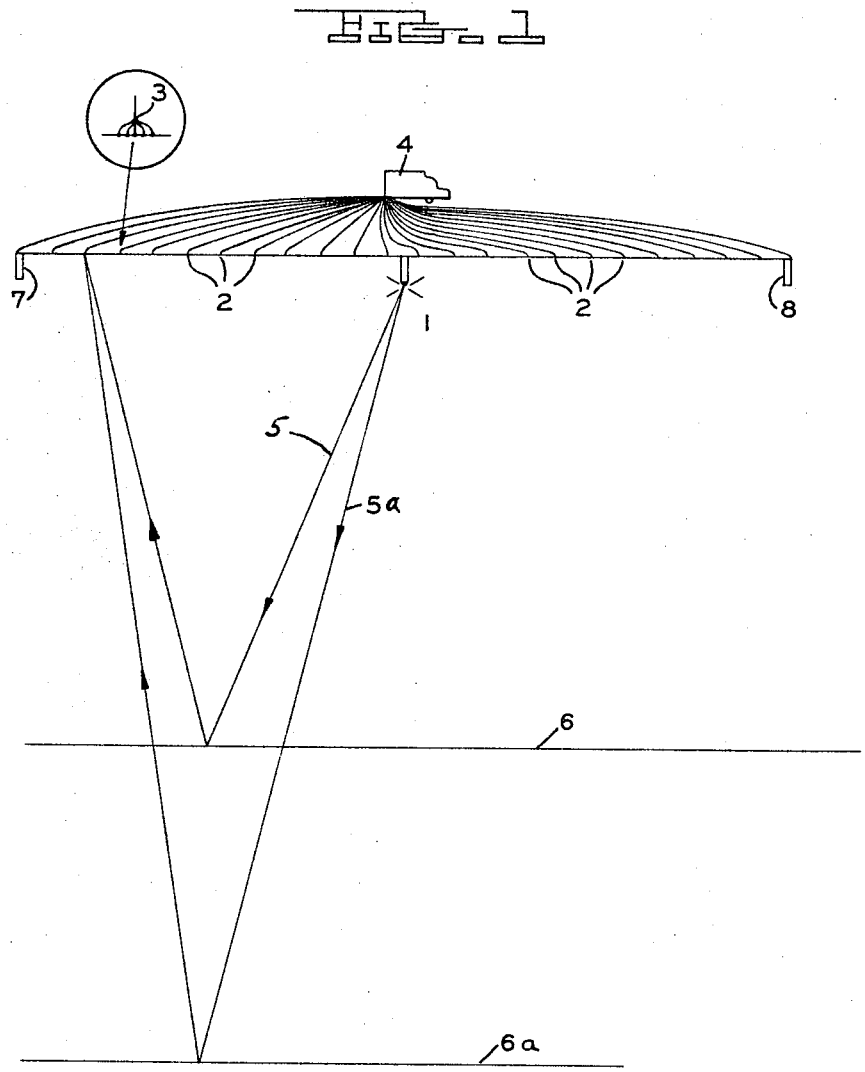

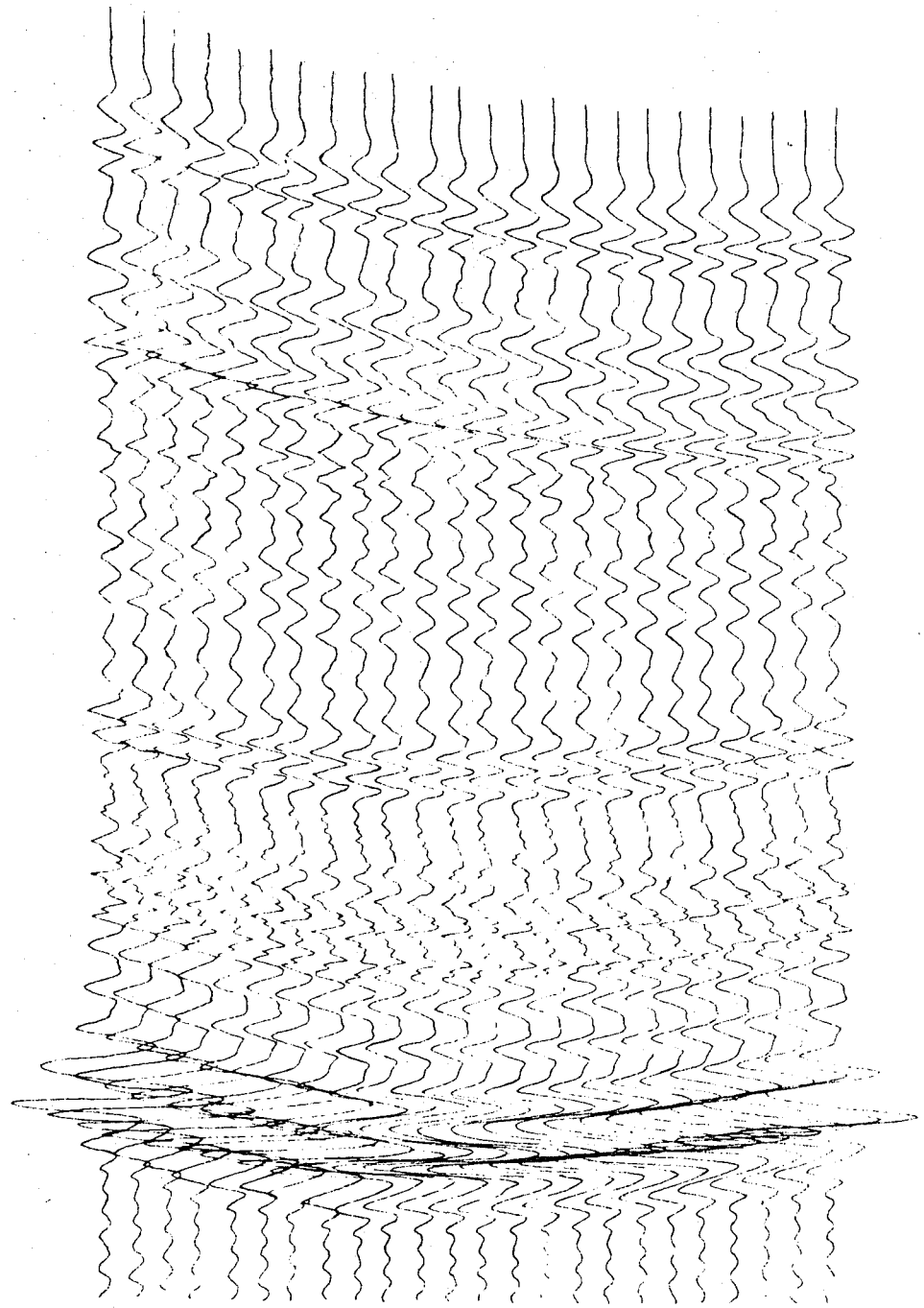

Feb. 20, 1968     M. B. DOBRIN ET AL     3,370,268
METHOD OF PROCESSING GEOLOGICAL AND GEOPHYSICAL DATA
Filed June 24, 1964     10 Sheets-Sheet 3
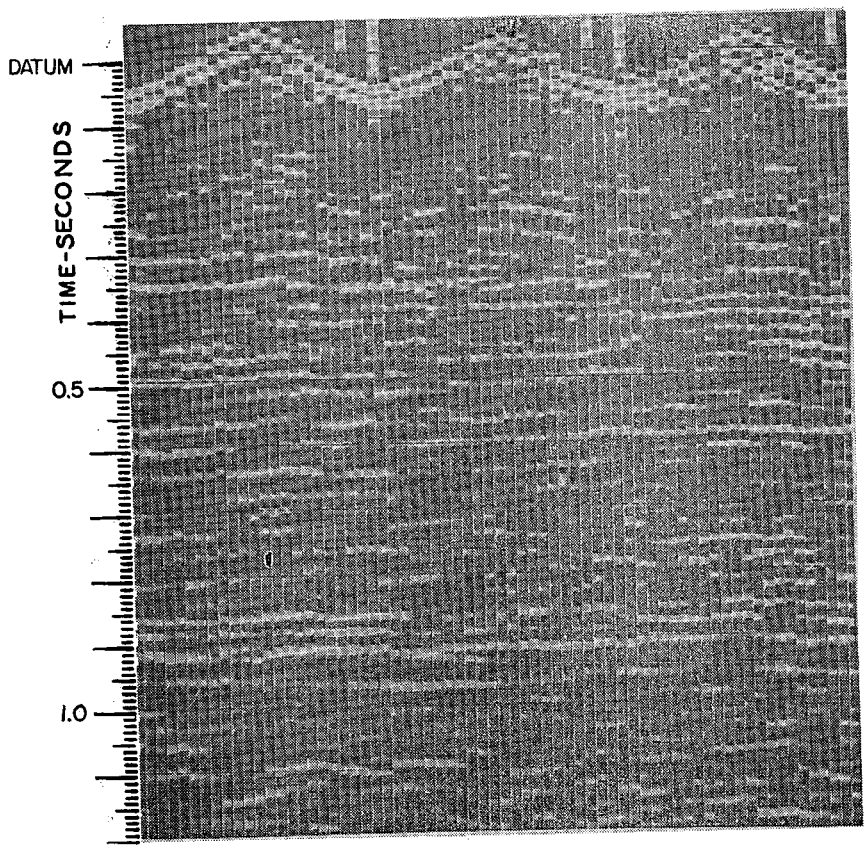
*INVENTORS*
MILTON B. DOBRIN
ARTHUR L. INGALLS
*BY*
Barnes, Kisselle, Raisch & Choate
*ATTORNEYS*

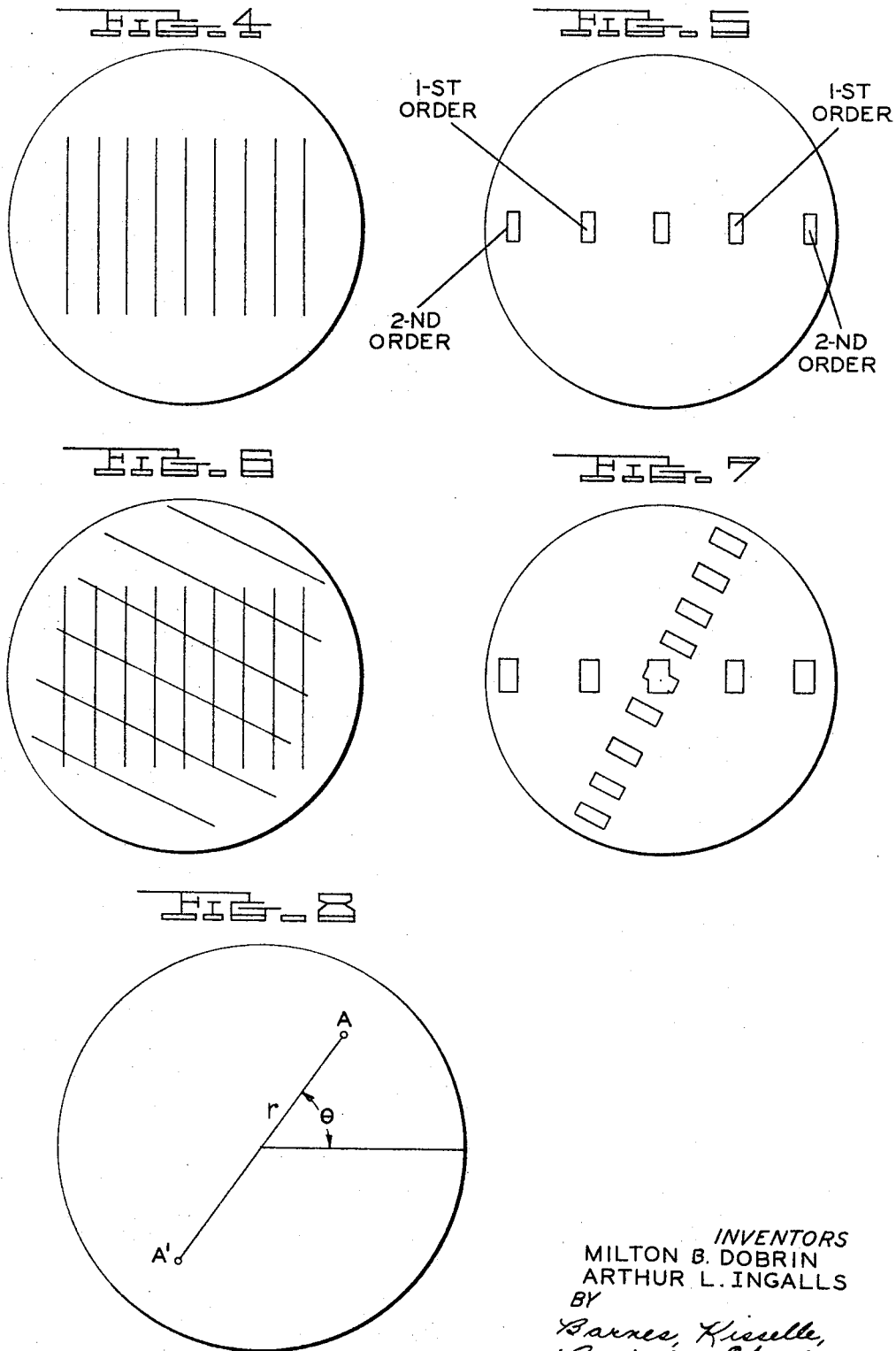

Feb. 20, 1968  M. B. DOBRIN ET AL  3,370,268
METHOD OF PROCESSING GEOLOGICAL AND GEOPHYSICAL DATA
Filed June 24, 1964  10 Sheets-Sheet 5
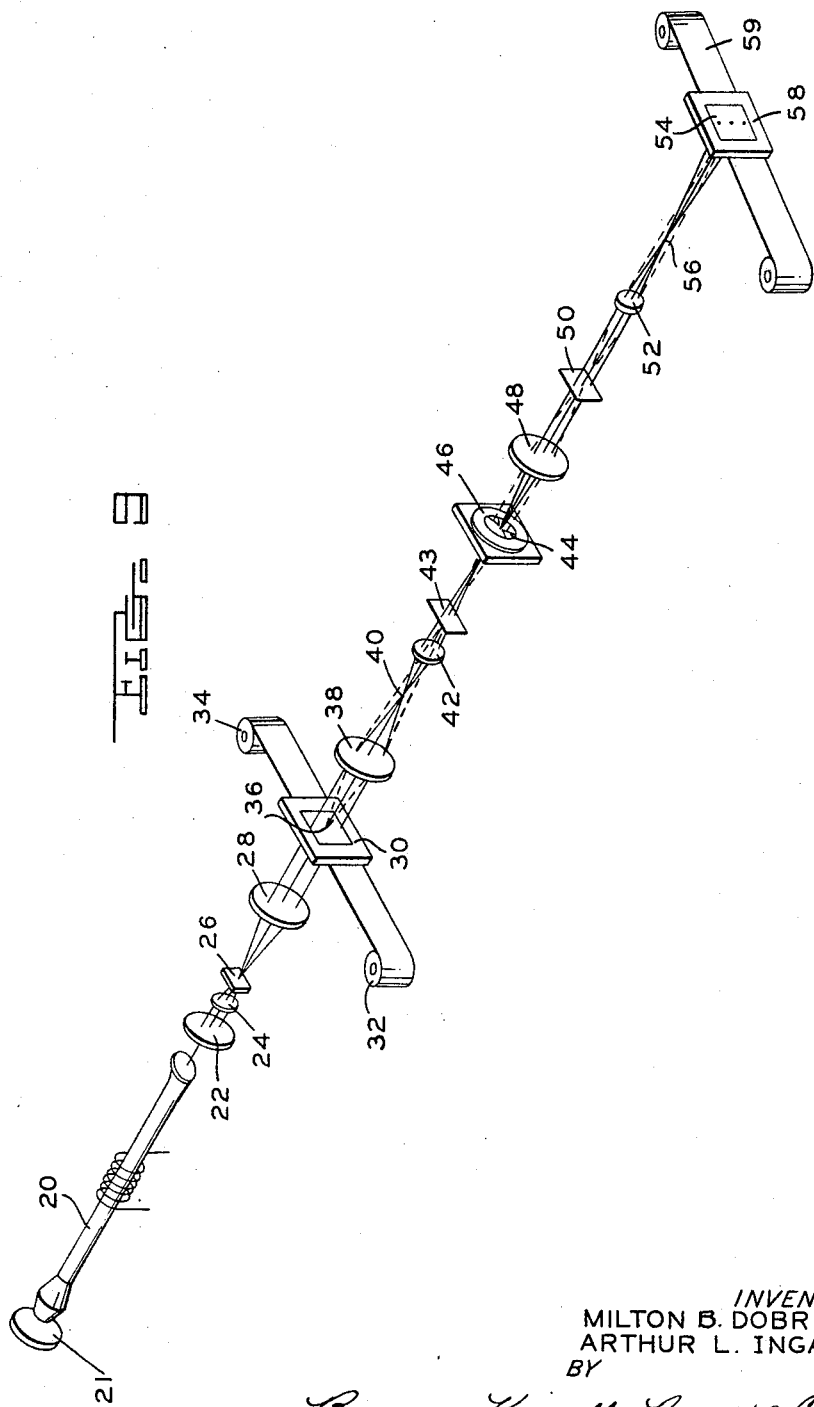
INVENTORS
MILTON B. DOBRIN
ARTHUR L. INGALLS
BY
Barnes, Kisselle, Raisch & Choate
ATTORNEYS

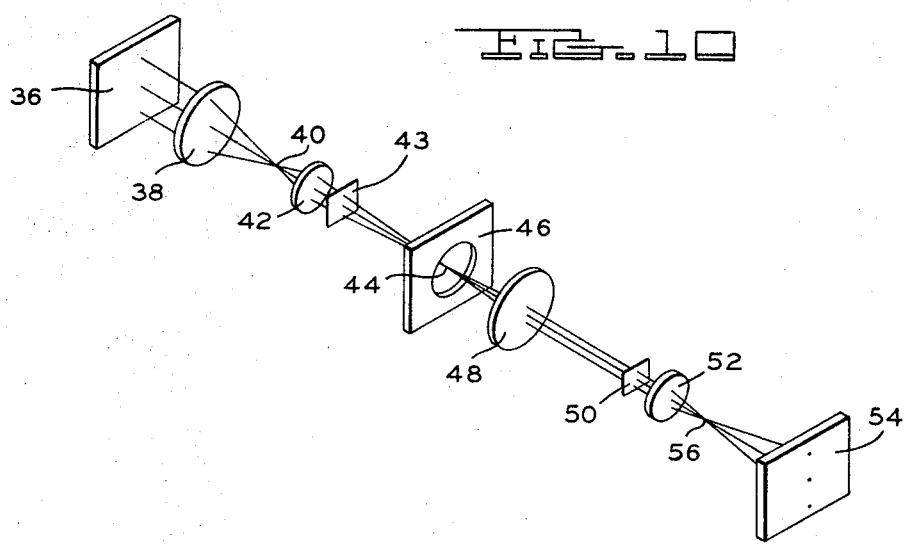
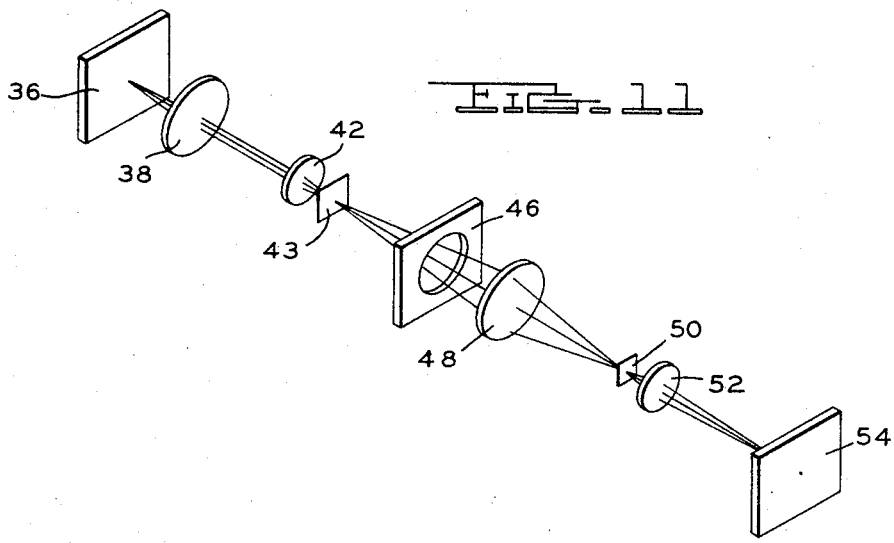

Feb. 20, 1968 M. B. DOBRIN ET AL 3,370,268
METHOD OF PROCESSING GEOLOGICAL AND GEOPHYSICAL DATA
Filed June 24, 1964 10 Sheets-Sheet 7

|← 1¾ MILES →|

TIME — 1½ SECONDS

INVENTORS
MILTON B. DOBRIN
ARTHUR L. INGALLS
BY
Barnes, Kisselle, Raisch & Choate
ATTORNEYS Feb. 20, 1968 M. B. DOBRIN ET AL 3,370,268
METHOD OF PROCESSING GEOLOGICAL AND GEOPHYSICAL DATA
Filed June 24, 1964 10 Sheets-Sheet 9
FIG. 16
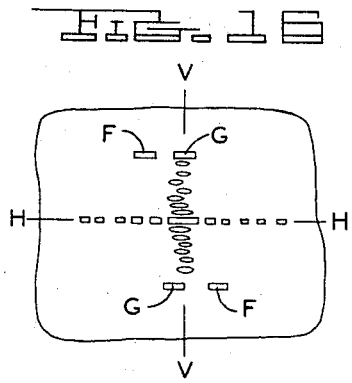
FIG. 17    FIG. 18
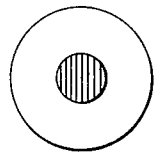 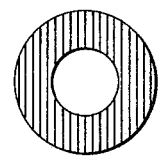
FIG. 19    FIG. 20    FIG. 21
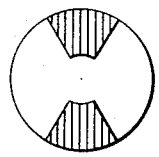 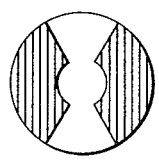 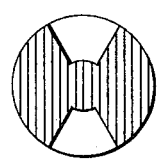
FIG. 22    FIG. 23    FIG. 24
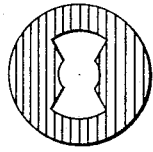 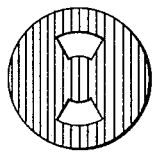 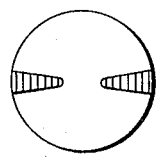
INVENTORS
MILTON B. DOBRIN
ARTHUR L. INGALLS
BY
Barnes, Kisselle, Raisch & Choate
ATTORNEYS

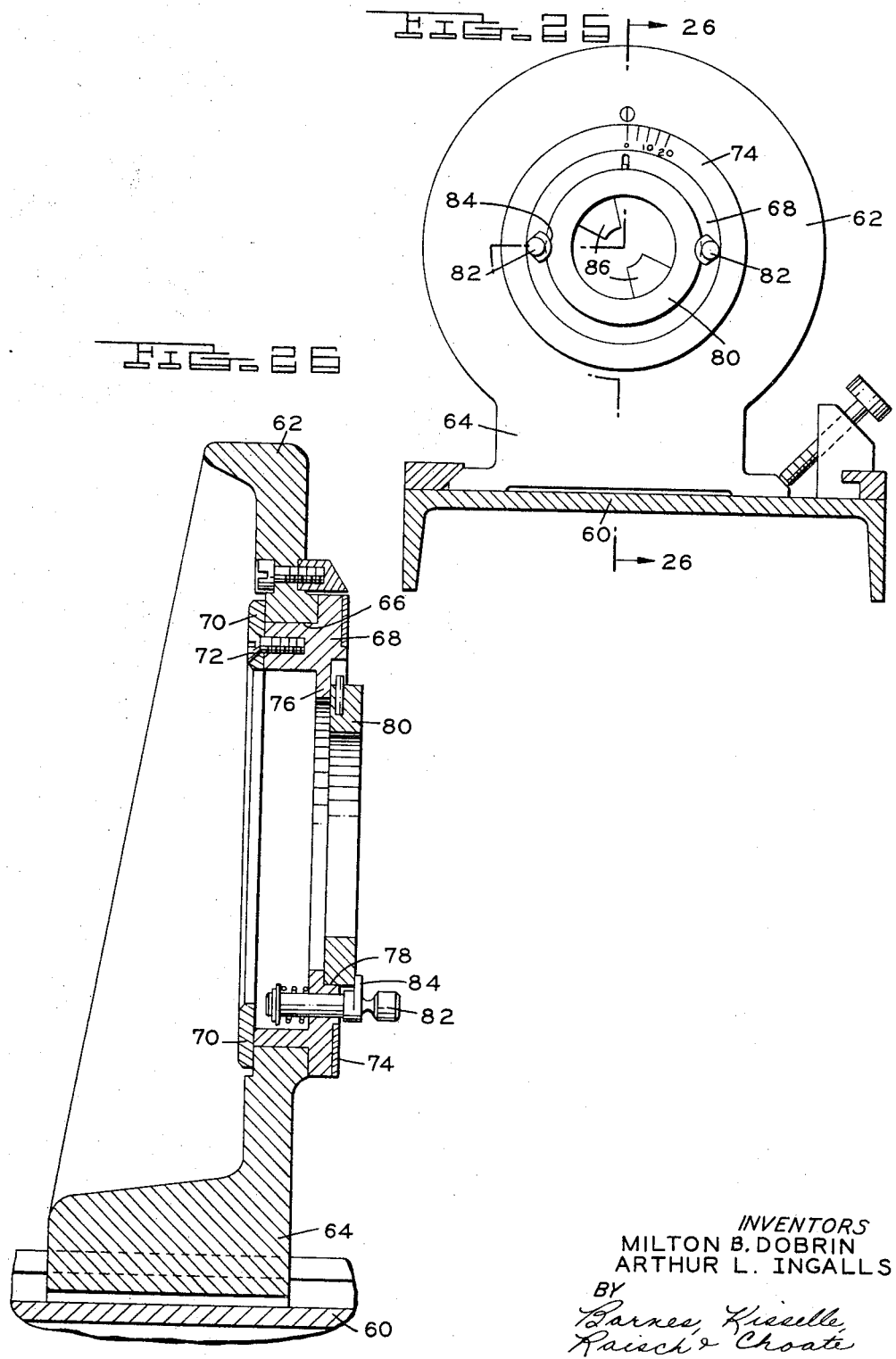

United States Patent Office 3,370,268
Patented Feb. 20, 1968

3,370,268
METHOD OF PROCESSING GEOLOGICAL AND GEOPHYSICAL DATA
Milton B. Dobrin, Pasadena, Calif., and Arthur L. Ingalls, Ann Arbor, Mich.; said Dobrin assignor, by mesne assignments, to United Geophysical Corporation, Pasadena, Calif., and said Ingalls assignor to Conductron Corporation, Ann Arbor, Mich., both corporations of Delaware
Filed June 24, 1964, Ser. No. 377,668
23 Claims. (Cl. 340—15.5)

This invention relates to a method of processing geological and geophysical data and more particularly a method of processing such data with the object of clarifying desired information by removing spurious signals having unwanted frequencies and orientations from the recorded data. The geological data most commonly processed consists of seismic signals obtained in surveys undertaken for the purpose of determining information regarding the subsurface and particularly for the purpose of discovering subsurface structures which may be associated with the accumulation of oil, gas, or minerals.

Drawings accompany the disclosure and the various views thereof may be briefly described as:

FIGURE 1, a diagrammatic view illustrating the manner in which seismic data is recorded.

FIGURE 2, a sample of recorded seismic data from a single shot.

FIGURE 3, a variable density record section of seismic data made from multiple shots in the field.

FIGURE 4, a diagrammatic view of a simplified object film or data transparency.

FIGURE 5, a diagrammatic view of a spectrum or diffraction pattern of the data of FIGURE. 4

FIGURE 6, a diagrammatic view of superimposed lines of different inclinations on a simplified object film.

FIGURE 7, a diagrammatic view of a spectrum or diffraction pattern of the data of FIGURE 6.

FIGURE 8, an illustration of the geometry of spatial frequency data in the diffraction pattern.

FIGURE 9, a diagrammatic view of a two-dimensional optical filter system illustrating both the image planes and the spectrum planes and showing one form of spatial filter.

FIGURE 10, a two-dimensional optical filter system of the type shown in FIGURE 9 illustrating only the spectrum plane rays.

FIGURE 11, a two-dimensional optical filter system similar to that shown in FIGURE 9, illustrating the picture or image plane rays.

FIGURE 12, a view of seismic data used in the object plane to create a Fourier transform.

Figure 12A:
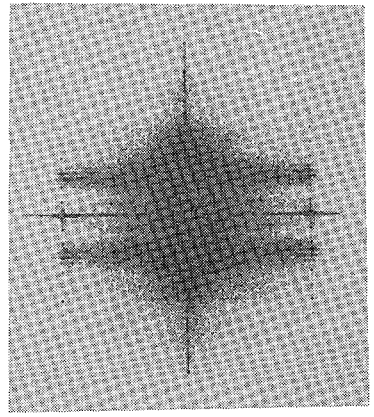

FIGURE 12A, a view of a spectral transform of the data of FIGURE 12.

Figure 13:
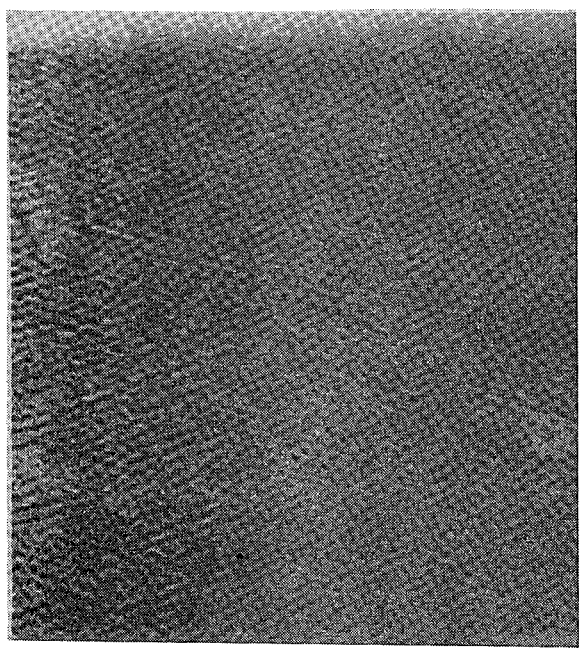

FIGURE 13, a view of a reconstructed image after a directional filtering operation.

Figure 13A:
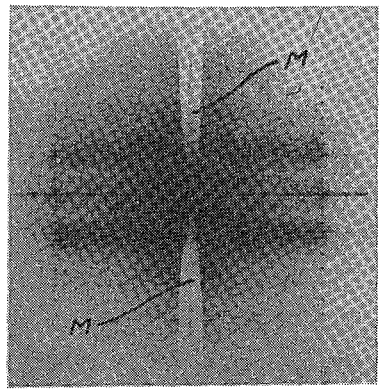

FIGURE 13A, a view of the spectrum showing the filter masks used to obtain FIGURE 13.

Figure 14:
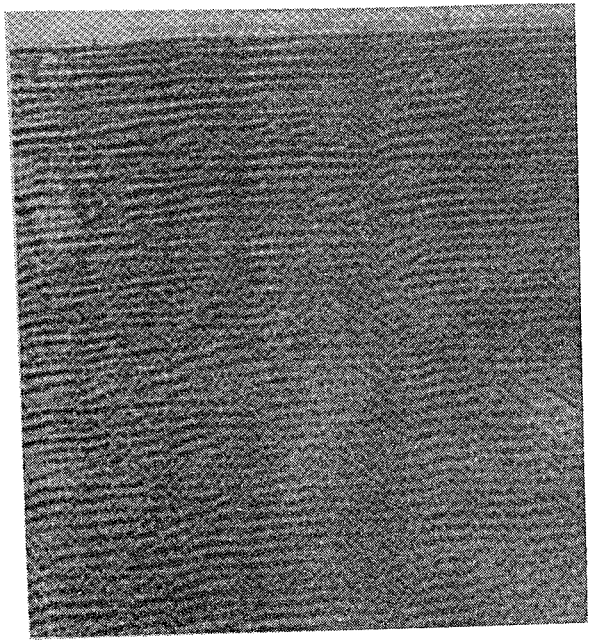

FIGURE 14, a view of a reconstructed image after an adjusted directional filter operation.

Figure 14A:
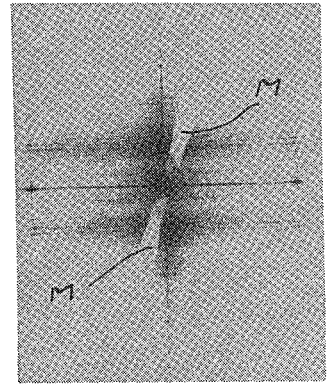

FIGURE 14A, a view of the spectrum showing the filter masks rotated clockwise from the position in FIGURE 13A.

Figure 15:

FIGURE 15, a view of a reconstructed image after a second adjusted directional filter operation.

Figure 15A:
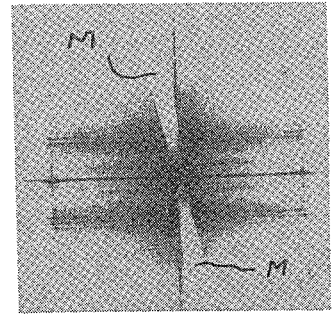

FIGURE 15A, a view of the spectrum showing the filter masks rotated counterclockwise from the position shown in FIGURE 13A.

FIGURE 16, a view of a diffraction spectrum illustrating the manner in which various light frequencies are sometimes distributed on an axis in the spectrum plane.

FIGURES 17 to 23, illustrations of various spatial filters which can be utilized at a spectrum plane in an optical system to filter out certain frequencies in order to permit reconstruction of the unfiltered frequencies for observation.

FIGURE 24, a view of a spatial filter of the type used in the filtering illustrated in FIGURES 13, 14 and 15.

FIGURE 25, a view of a filter holder which can be utilized to mount various filtering and masking devices in various positions of rotation.

FIGURE 26, a sectional view on line 26—26 of FIGURE 25.

The recording procedures used in seismic prospecting are well known to those versed in the art and are illustrated by FIGURE 1. The source of seismic energy shown in the figure as an explosion of dynamite buried a short distance under the earth's surface, may also be the impact of a weight dropped or impelled onto the earth from above the surface or in some cases a vibrator or multiplicity of vibrators on the surface. For convenience the source, regardless of its type, will be referred to here as the shot. The source is normally located at the center of a line of seismometers or geophones 2 which respond to the elastic waves generated in the earth at the source, by producing electrical signals corresponding to these vibrations. For cancellation of noise, groups of such geophones disposed along the line in close proximity have their electrical outputs combined by a series or series-parallel connection into a single recording channel as shown in inset 3 of FIGURE 1. For convenience of representation, FIGURE 1 shows each such group as a single geophone. In most seismic surveys, twenty-four such channels are recorded, twelve on each side of the energy source, located at the shot point. The electrical signals going into each recording channel are amplified and recorded on magnetic tape or on photographic paper by a multichannel oscillographic, or similar type of camera usually located in a recording truck 4 (FIGURE 1).

When the energy source is actuated (e.g. the dynamite detonated in a shot-hole explosion) seismic waves travel downward into the earth as along rays 5 and 5a until they strike interfaces or boundaries between different types of rock across which there is appreciable contrast in seismic velocity or density. At such interfaces or boundaries 6, 6a, part of the energy is reflected back to the earth's surface. The reflected impulses are translated into electrical signals by the geophones at the surface. At the same time, other waves associated with the shot, such as surface waves, refractions, reflections from surface and near-surface irregularities, diffractions, and scattered noise as well as earth motions not related to the shot, such as wind noise, are picked up by the geophones and electrical signals from these sources are also recorded along with reflections from deep subsurface boundaries.

A typical form of registration of the seismic signals is a multi-trace oscillographic record (FIGURE 2) in which each geophone group is represented by a separate trace, the individual traces being disposed on the record in the same sequence as that in which the geophone groups are laid out along the recording line on the earth's surface. On these records, coherent or traveling waves, such as those reflected from subsurface boundaries are indicated by a lining up or correlation of wave elements, such as peaks or troughs of characteristic form; such correlations can be followed across a multiplicity of traces by someone skilled in the art of interpreting seismic records. The identification of such events as the desired reflections or as other types of wave can be made on the basis of wave form or, more reliably, on time differentials or inclination of the events between successive traces or across a multiplicity of traces up to the twenty-four constituting the record.

At each end of the geophone spread shown in FIGURE 1, there are shot points 7 and 8 from which the shot previous to and that subsequent to the shot at 1 are fired respectively as shooting progresses along the line. The shot at 7 is received by the twelve geophones between 7 and 1 on the right and by a similar spread of twelve geophones on the left of shot point 7. The shot at 8 is received by the twelve geophones between shot points 1 and 8 on the left and by a similar spread of twelve geophones to the right of shot point 8. The subsurface reflecting points, in the case of horizontal layering, from shot point 7 as received between shot points 7 and 1, extend only half-way from point 7 toward point 1. The reflecting points for energy from shot point 1 received by the same geophones extend over the right half of the interval from 7 to 1. By shooting continuously along the line and advancing twelve geophones at a time along the profile between successive shots, continuous subsurface coverage is obtained which is represented by the multi-shot record section shown in FIGURE 3.

While the individual oscillographic record is still the basic form in which signals from a single shot are registered, a more convenient form of presentation is the record section, in which signals from a line of shots disposed along a profile as previously indicated are represented on a continuous series of traces corresponding to the surface coverage of a multiplicity of individual shot-geophone dispositions of the type shown in FIGURE 1. On such sections times for the individual traces are generally corrected for elevation changes at shot and geophone, for variations in thickness of any low-speed surface layer, and for the increasing length of reflection wave path as the distance from shot to geophone increases along the profile. These may be referred to as a "corrected multi-trace record section."

Although record sections can be made with individual traces in the oscillographic form shown for the record in FIGURE 2, the traces are more usually registered as variable-density or variable-area signals so as to simulate in appearance a geological cross-section in which the reflections appear more or less as white or grey stripes on a dark background. FIGURE 3 illustrates such a variable-density record section. Each vertical trace represents the ground oscillations in the seismic frequency range, the voltages corresponding to the oscillations modulating the intensity of a light source at the position of a single geophone group. Because the groups have approximately equal separations on the earth's surface, the position of the trace along the horizontal axis indicates the approximate location on the profile of the reflecting point in the earth while the vertical position is determined by the time required for the seismic wave to travel from the source to the reflecting surface and back to the geophone at the surface after the corrections indicated in the previous paragraph have been made. The relationship between this time and the actual depth of the reflecting surface depends on the velocity of seismic waves along the path, a quantity which may be measured in nearby wells or by special seismic shooting techniques well known in the seismic prospecting art. Variable-area sections are similar in appearance but the modulation of the traces is controlled by a different mechanism. FIGURE 27 represents a variable-area section.

The direct reflections from subsurface geological boundaries constitute the information on these sections which are of greatest practical interest, as these make it possible to determine the structure of beds which may entrap gas or oil or contain other useful minerals. However, waves of other types may also appear as lineups or stripes on the record sections and these may often obscure, distort or confuse the reflection events of primary interest. Typical sources of such spurious lineups have been mentioned above. The interference may result from the fact that the spurious lineups are in a direction different from the reflections so that one type crosses the other and the continuity and recognizability of the reflections are disturbed. In some cases, the disturbing events have frequencies which are different from those of the reflections and the interference can be removed by filtering out all oscillations on the section having frequencies different from the reflection frequency.

Another common type of seismic survey involves the recording of waves, originating from the same type of source as is used for reflection work, by geophones disposed at such a large distance from the source that the waves travel for part of their paths along or parallel to the boundaries of formations having higher velocities than those lying above them. From the times required for these waves to travel along their paths and from the relations of the times at adjacent receiving positions at the surface, it is possible to determine the depths and inclination of the refracting boundaries. This type of prospecting is designated as a refraction shooting and it has the advantage that the velocities of seismic waves in the formations can be determined in addition to their structures. Refracted signals can also be registered in the form of variable-density or variable-area record sections similar to those made for reflection data. The stripes or lineups representing the desired refracted waves can be obscured by interfering events just as is the case with reflection lineups. In second-event refraction work, arrivals from beds of interest are often obscured by waves from other formations which arrive at the surface a short time earlier. It is an object of the present invention to utilize an optical filtering process involving operation on light rays diffracted by a film transparency of the record section for separating the desired from the undesired information on records containing reflection and refraction information called record sections. A simplified explanation can be obtained by considering the record section to be a diffraction grating.

The basis for this type of optical filtering lies in the fact that the passing of a monochromatic light beam through such a simple diffraction grating (FIGURE 4), which consists of a series of very fine slit openings, results in a so-called Fourier transform of the spatial signal represented by the grating itself (FIGURE 5). This transform consists of a plurality of plane wave fronts of the monochromatic light concentrated by a lens system in what is called the transform or spectrum plane. The position of the light concentrations serve to define the frequency spectrum of the pattern of the grating. The light concentrations take form of a series of dots or short lines which are disposed along a line which is perpendicular to the direction of the lines constituting the original grating. The farther the dots from the optical axis, the higher is the "spatial frequency" of the grating, this frequency being defined as the reciprocal of the distance between the line centers of the grating, often called the grating constant.

If the diffracting source consists of two superimposed sets of parallel lines, the respective sets make an angle with one another as shown in FIGURE 6. The corresponding diffraction pattern (FIGURE 7) will show two linear sets of dots, each set being oriented at right angles to the line on the source pattern to which it corresponds. Each line of dots will show the spectrum or spatial frequency of that corresponding lineation in the original object pattern. A great number of directions of lineation can be resolved in this way.

It is thus evident that the light distribution in the diffraction or spectrum transform plane of the object gives two independent kinds of information about the object, as shown in FIGURE 8. The orientation of each lineation in the original picture is perpendicular to the radius extending at angle $\theta$ from the central axis to the dot A, A' on the diffraction pattern corresponding to this lineation. The length of this radius $r$ is a measure of the spatial frequency of this lineation, the frequency being proportional to this length.

The diffraction pattern, referred to herein as a spectrum, sometimes called a frequency plane, of a two-dimensional light distribution $f(x,y)$ can be shown to be the Fourier transform $F(W_x,W_y)$ of $f(x,y)$. The light distribution in the image plane is the two-dimensional Fourier transform, $F(W_x,W_y)$, of the diffraction pattern or the transform of the transform of the original distribution. As the transform of the transform of a function is simply the function itself, we can express the unfiltered image of the light distribution $f(x,y)$ as this same multiplied by a constant to take care of any changes in scale or intensity.

This relationship constitutes the basis for the type of optical filtering made use of in this invention. As each concentration of light in the diffraction pattern represents a particular combination of frequency and orientation in the diffracting source signals, we should be able to attenuate or remove all components of this signal having this frequency and orientation by blocking or otherwise reducing the intensity of this light spot in the transform plane. The masks can consist of opaque barriers, such as wedges, needles, or wires, which are properly disposed in the transform plane to remove undesired frequencies or orientations in the transparency constituting the two-dimensional pattern to be filtered.

Usually the seismic data is in a form too large for direct use in an optical system and it is reduced to a size appropriate to fit the aperture of the particular optical system to be used. In this reduction, the lines in a particular specimen are also reduced to have a line density to lie in a proper range. In other words, the specimen may serve as a diffraction source in the optical system. The data is usually recorded in optical form on a transparent film referred to herein as a "transparency." It will be recognized that a reflective type of recorded data could be used under some circumstances and the use of the term "transparency" shall be taken broadly to include recorded line data in optical form.

If a seismic record section in variable-density or variable-area form is reduced in size as indicated above and put into the form of a film transparency, it can serve to give rise to diffracted light, the resulting diffraction pattern being the transform of the two-dimensional light distribution represented by the section. Each group of lineups or stripes on the section, whether it represents a reflection or some other type of wave, will have a light concentration corresponding to it on the diffraction pattern in the transform plane. To filter out any events of undesired frequency or orientation on the section one need only mask the light spot representing its transform. The event so filtered should not be observable in the final image.

It is, therefore, an object of the invention to utilize optical spatial filtering for the analysis of what is referred to as seismic data and also other geophysical and geological data, and it is a further object to utilize a spatial filtering system to block out or eliminate undesirable noise and interference patterns from a transparency and to reconstruct such transparency to form a filtered image which can be used in actual geological or geophysical interpretation or depth charting or mapping.

Other objects and features of the invention relating to details of construction and operation will be apparent in the following description and claims.

In the embodiment shown in FIGURE 9, a laser light source 20, an important part of the optical system for two-dimensional filtering, is shown with appropriate optical lenses 24 and 28 for expanding the size of the parallel beam and therefore the wave front of the source. The illumination element 20 consists of a neon-helium gas laser with lens 24 to condense the light beam to a point and then a pin hole shield 26 to improve the coherence of the laser.

The laser unit 20 is a sealed gas tube containing neon-helium gas with angled end plates which are optically flat through which light may pass. The transparent mirrors 21 and 22 are sometimes referred to as a Fabry-Perot etalon cavity.

A collimator 28 is utilized to render the light parallel again to provide a plane wave front of illumination. The laser objective 24 and the collimator 28 are separated by the sums of their focal lengths when parallel light is produced by the laser, or separated by a different distance when the laser is operated in a configuration which produces a spherical wave front rather than a plane wave front. In either case, the pin hole shield 26 is placed at a point focus of light coming from the laser objective to eliminate undesired modes in the beam. This type of illumination section produces a plane wave front perpendicular to the optical axis and suitable for providing illumination in the form of a plane wave to the two-dimensional optical filtering system. While it is possible to utilize other light sources of monochromatic nature, the laser system described is preferred.

The optical filter section of the system starts beyond the collimator 28 with an object plane at which is located a transparency holder 30 which can be utilized for a single piece of transparency film or a continuous strip of film carried on rollers 32, 34. Utilizing the holder 30 a section of transparency 36 can be mounted and properly positioned in the optical plane and held stationary for a sufficient period to perform what functions are desired on it.

Beyond the object plane at the holder 30 is a transform objective 38 which produces a Fourier transform of the light emerging from the object transparency 36 at the first frequency plane of the optical system, this plane being located in space at 40. A transform enlarging lens 42, adjustable laterally and vertically, creates a first aerial image of the object at 43 on the axis of the system and radially spreads the information at the second spectrum plane located at 44 where there is positioned a filter frame 46 which will be described in greater detail later. The spreading of this information at the second spectrum plane 44 reduces the positional sensitivity of any spatial filtering function accomplished at the frame 46. In a sense, this might be called a magnification which renders motion in the direction of the optical axis less critical.

Beyond the second spectrum plane is positioned a reconstruction objective 48 for the purpose of producing a reconstructed image of the object transparency as modified by any data removed by a filtering operation accomplished at 46. This image, also sometimes referred to as an aerial image, occurs in space at 50 and also passes through an image enlarging lens 52, the purpose of which is to change the size of the filtered image to the original size or to a size which can be advantageously viewed or photographed with suitable photographic materials at a filtered image plane 54. Between the objective 52 and the viewing plane 54 is a third spectrum plane 56 located in space. A frame 58 serves to hold a film 59.

As previously explained, the function of a diffraction grating, together with a transform objective, is to create a frequency diffraction spectrum where wave lengths of the same frequency and directional alignment will tend to accumulate and reinforce each other to create what might be referred to as "bright spots" or "points of concentration" of light positioned outwardly and at certain angles to the optical axis of the spectrum which is selected for purposes of reference.

Where a transparency or film object, which in this case serves as the diffraction source, is composed of lines which are disposed at certain spatial frequencies and also disposed at various angles, it is possible to detect in the spectrum of the transparency certain concentrations of light disposed at certain distances away from the center which is the direct current point commonly called DC, and also at angles away from a line of reference. This spectrum can be observed visually by the naked eye at the second spectrum or diffraction 44 where there is located a holder for a spatial filter. In analyzing any transparency, therefore, the spectrum is examined and, on the basis of the examination, the observer can determine how to pass or block out light concentration in the spectrum corresponding to certain frequencies or directions in the spectrum by placing a filter at the second spectrum plane. In some cases this can be what is called a pass filter which passes certain frequencies and directions that can be reconstructed again at the image 54, or in some cases, it may be a rejection filter which blocks off certain frequencies and orientations and passes the remainder which appear in the reconstructed image. Thus, with suitably shaped masks or transparencies, the reconstructed image of the transparency can be viewed and photographed with only part of the original frequencies and directions.

As an example of this, in FIGURE 12, a transparency is shown which has been obtained from the original seismic data and it will be noted that this has a number of lines many of which are repetitive with some going in some directions and others at angles thereto.

FIGURE 12 is a variable density record section of the type previously discussed and illustrated in FIGURE 3. Each of these record sections has a time scale as the vertical ordinate, the time increasing downward. Normally, the time is referred to the shot instant with the zero time reference at the top of the section. In FIGURE 12, the top of the section has been selected at a point below the surface at a time about 1.5 seconds after the shot instant for each shot represented and includes about 1½ seconds.

Each vertical stripe in FIGURE 3 represents the output of a single geophone group, each set of twenty-four adjacent stripes representing what is known as a profile, the signal received from a single shot located at the center of the twenty-four group spread stretched out along a line on the earth's surface. The entire section shown in FIGURE 12 shows the signals obtained from seven shots disposed at approximately equal intervals along the profile. The vertical dimension is proportional to time in seconds and the horizontal dimension approximately proportional to horizontal distance in miles along the profile represented by the section. The section shown in FIGURE 12, observed by a geophysicist, would lead normally to a conclusion that the formations are dipping slightly to the left, a situation normal in the area and not indicative of any anomaly suggesting the presence of oil entrapping structures.

In FIGURE 12A, the spectrum for this transparency is shown where a horizontal and vertical reference line delineate the data for reference and the data is grouped around the central portion of the figure with two substantially horizontal areas disposed on either side of the horizontal reference line.

In FIGURE 13, a reconstructed image is shown of the original data shown in FIGURE 12, portions of it having been filtered out by the masking portions M shown coming in from each side of the spectrum data as illustrated in FIGURE 13A. The differences in the reconstructed image over the original image data can be observed. Essentially all of the original horizontal and near horizontal lines are removed and other lines at substantial angles to them are enhanced as can be observed in FIGURE 13.

In this area where this record section was made, it is known that the geological formations have gentle dips so that true reflections appear on the sections within a narrow angular range of being horizontal. The steeply dipping events shown in FIGURE 13 are, therefore, not reflections but represent noise, in this case, possibly reflected refractions. This example illustrates one useful application of the technique in that it is possible to remove the desired reflective information and demonstrates more clearly than would otherwise be possible, the nature of the noise which can interfere with the reflection. This knowledge provides a basis for designing field procedures and other processing operations for optimum removal of such noise.

In FIGURE 14, a similar effect is shown wherein the masking devices M are rotated in a clockwise direction about 20°. Here again, a comparison of FIGURE 14 with FIGURE 12 will show that different lines appear. This directional filter tends to remove alignments that slope down toward the right side, thus enhancing alignments sloping down toward the left side. The alignments of the latter type are believed to be multiple reflections from shallower beds which are known to dip toward the left in the record section shown.

In FIGURES 15 and 15A, the results of a shift counterclockwise of the masking devices is illustrated. In this result of FIGURE 15, the lines which are sloping down toward the right side become emphasized. The general slope has been emphasized by a dash line on the drawing (FIGURE 15). In this instance, this slope obtained by optical filtering is confirmed by actual knowledge of the area obtained by drilling.

If now the record section of FIGURE 15 is compared with the unprocessed record section of FIGURE 12, it will be noted that the general dip (angle to the horizontal) of the reflection events of FIGURE 15 is opposed to what is known to be the regional slope of the geological formations (beds) in the area. This indicates the presence of an anomalous structural situation in the vicinity where the section was shot and the possible presence nearby of a structural high, which could cause the entrapment of oil.

In FIGURE 16, a sharply delineated diffraction spectrum will be seen wherein two pairs of dots F—F and G—G are shown disposed at an angle to the vertical reference. This spectrum of FIGURE 16 is the result of optical filtering of a small portion of the record section shown in FIGURE 12. Each of the dots corresponds to well-defined seismic events included in the examined area. When a pattern of this nature is observed in a spectrum plane, any pair of these sharply delineated spots or events can be masked out to obtain a result which is free from the frequencies and orientations creating them.

Various masking or light passing devices are shown in FIGURES 17 to 24. In FIGURE 17, a masking device at the center would take out what is referred to as the direct current or DC portions of the spectrum including also some of the lower frequencies. This is sometimes referred to as a high pass or low cut filter. Low frequency seismic signals on a record section could be filtered out by such a mask.

In FIGURE 18, the DC and lower frequencies would be passed and the outer higher frequencies would be cut out. This is sometimes referred to as a low pass or high cut filter. High frequency seismic events, such as wind noise or certain types of ringing encountered in marine work, could be filtered out by this type of mask.

In FIGURE 19, the wedge segments would mask out certain spots, such as those shown in F—F or G—G in FIGURE 16.

In FIGURE 20, the masking would remove the higher frequency events oriented horizontally and allow the DC frequencies and events oriented vertically to pass. The opposite result is obtained by the masking device of FIGURE 21.

In FIGURE 22, the DC frequencies and low frequency vertically oriented events such as separations between traces would be passed.

FIGURE 23 is similar to FIGURE 22 blocking out the direct current and very low frequencies.

FIGURE 24 is illustrative of the masking devices M used in FIGURES 13A, 14A and 15A. This can be obtained by using two blunt-ended, fairly heavy needles, or the masking devices can be opaque material directly mounted or if necessary carried on a transparent sheet of material, such as glass, to obtain proper support. These can be mounted in a device shown in FIGURE 25 wherein it will be seen that the masking devices can be readily changed and rotated.

It will be appreciated that while in the above description mention has been made of either passing or masking information, that it is also possible to let frequency data through in altered form and then get reconstruction which includes some of the original material unaltered and other of the original material altered. For example, this alteration may include simply a change in the phasing of the light by some fraction of a wave length.

It is also pertinent to the disclosure to designate the type of lenses that are used in one operating system of the type shown in FIGURES 9, 10 and 11. It will be appreciated that the means of holding the lenses is standard and suitable means would be provided to position these lenses on a suitable optical bench with necessary adjustment holders along the lines of those shown in FIGURES 25 and 26. In particular reference to FIGURE 9, the laser objective lens 24 is a 16 mm. microscope objective. The collimator 28 is a 152 mm. f/2.8 biotar-type lens. The transform objective 38 is a short focal length lens, 100 mm. f/2.3 biotar-type lens. The transform enlarging lens 42 is a 75 mm. f/2.3 biotar-type lens, and the reconstruction objective 48 is a 100 mm. f/2.3 biotar-type lens. The last lens in the series, the image enlarging lens 52, is a 40 mm. f/2.3 biotar-type lens. This combination of lenses in the optical circuit has produced successful filtering operations on a relatively short optical bench.

In FIGURES 25 and 26, an optical table or bench 60 has locked thereon a mount ring 62 with a foot portion 64 suitably fastened to the bench. Ring 62 has a circular opening 66 (see FIGURE 26) and carries an annular ring mount 68 having a slip fit in opening 66 and held in place by a lock ring 70 attached by screws 72. On the outer face of the flanged ring 68 is a graduated dial 74. Ring 68 also has an inner annular flange 76 which is annularly grooved at 78 to provide a rotatable bearing seat for a replaceable filter ring 80. Opposed spring plungers 82, having a small cam latch 84, are utilized to lock the filter rings 80 in place. A number of different rings can be available for quick positioning by use of the plungers 82. The particular ring 80, shown in FIGURE 25, shows two wedge-shaped filters 86 which could be used, for example, in connection with the filtering operations above described.

Two-dimensional optical filters have heretofore been made with lenses of very long focal length in order to produce detail in the spatial filtering plane large enough to permit easy fabrication of spatial filters. Reconstruction objectives have also been of very long focal length in order to obtain a filtered image of useful size. For this reason, two-dimensional filters have become quite long, in the nature of 20 to 25 feet, and some of the lenses have been quite large. The system described has the advantage that the optical section occupies perhaps a total of 2 to 3 feet as compared with 7 or 8 feet in previous devices so that the total system can occupy perhaps 10 feet compared to 20 to 25 feet previously.

In FIGURE 10, the spectrum plane rays have been shown. The object plane at 36 passes collimated light to the transform objective 38 and the first spectrum or diffraction plane occurs at 40. Transform enlarging lens 42 creates the first aerial image 43 and the second spectrum plane at 44. The reconstruction objective 48 creates a second aerial image 50 which passes through the enlarging lens 52 through a third spectrum plane 56 to the filtered image 54. Similarly, in FIGURE 11, the same parts are shown with the picture plane rays illustrated so that it will be seen that the first aerial image 43 appears beyond the transform enlarging lens 42 and the second aerial image appears at 50 between the reconstruction objective 48 and the enlarging lens 52. As an example of the magnifications involved, in FIGURE 11, from the original objective 36 to the first picture plane 43, there is a .4 magnification, and from the first image 43 to the second image 50 there is a .625 magnification making a total overall magnification from 36 to 50 of .25. Accordingly, the magnification from 50 to 54 is required to be 4.0 to bring the filtered image back to the original size of the original data image.

One of the advantages of the present system is that the diffraction pattern, as illustrated in FIGURE 12A, for example, can be studied when the optical system is set up and the data in place. In some instances, it is possible to recognize in the diffraction pattern where unwanted frequencies lie since very often the events showing ringing or other interferences have a characteristic recognizably different from that of the rest of the pattern. In other instances, the use of various filters in various positions of rotation permits observation of the reconstructed image visually and, if desired, photographically, so that, based on prior knowledge of the general area, the proper filter can be selected for any desired reconstruction.

Multiple reflections, which are in effect reflections from shallow formations which have come toward the surface more than once constitute a familiar form of interference in seismic work in many parts of the world and are known to be particularly common on the deep portions of seismic sections or data displays as in the Gulf Coast or Libya. Conventional means of attenuating or eliminating multiple reflections in seismic work are complicated, time-consuming and costly, and often unsatisfactory. Because of this, it has often been considered necessary, where multiples are to be eliminated, to use special and much more expensive techniques than are normally used where this problem is not encountered.

Directional filtering in optical processing is a relatively quick and effective technique for filtering multiple reflections from seismic sections made by conventional rather than by these special techniques, by using orientations of alignments as the parameter for filtering. Multiple reflections from the earth's surface tend to align themselves at angles from the horizontal more or less twice those of the reflections from those shallower formations where the multiples are generated. Often the true reflections arriving at the same time as the multiples, but overridden by the multiples, show different slopes. When the multiples are filtered out, these differently oriented true reflections become more visible and are thus enhanced. FIGURE 15 displays just this kind of directional filtering of multiple reflections and consequent enhancement of true reflections sloping in a different direction. It so happens in this case that the dip of the true reflections is structurally very significant, and knowledge of this could well lead to the discovery of an oil or gas field.

The actual selection of the best filter position for processing data such as shown in FIGURE 12, for the purpose of eliminating multiple reflections and enhancing the desired deep rightward-dipping reflections, can be made visually. With the transparency to be processed in place (FIGURE 9, elements 36, 30), the filters (FIGURE 13A or FIGURE 24) in the spectrum plane are slowly rotated while the operator looks at the final image in the filtered image plane (FIGURE 9, element 54). When rotation progresses to the point where the maximum elimination of multiples is effected, the maximum enhancement or standing out of the previously concealed differently sloping true reflections will be clearly visible. The position of the pair of masks shown in FIGURE 15A, which produced the desirable filter image, FIGURE 15, was determined in this manner.

Undesired alignments will often be clearly discernible in the diffraction pattern in the form of concentrations of light. Masks can then be placed so as to cover these bright spots, in order to filter out data lined up in the corresponding directions, while passing everything else.

An example is next given of the use of optical processing in the analysis of a frequency-filtering problem. The spectrum plane obtained from one particular seismic section is studied and the solution indicated for the aforementioned problem is used to enhance the seismic data in said section.

Thus, seismic data may occur in the form of variable-area sections in an area where a considerable amount of ringing or reverberation is present. This effect is often noted in water layers of certain depths or in some land areas, where a near-surface layer exists whose upper and lower boundaries have very high reflection co-efficients, and where this layer is of a thickness such that the reverberations set up at these boundaries are of wave lengths such that they reinforce one another. This reinforced "ringing" is often very strong and it tends to override and conceal the reflection information which is desired in seismic prospecting. The frequency of the ringing is a function of the thickness of the layer giving rise to it. Ringing is evident in the data, in the form of lengthy successions of equally spaced parallel lines.

Such ringing constitutes a serious obstacle to getting usable data in seismic exploration for oil in many important petroleum-producing regions of the world, including parts of the area off the shores of Texas and Louisiana, in Lake Maracaibo and the Persian Gulf. Conventional methods for attempting to eliminate ringing from seismic data include electronic filtering with both ordinary and notch filters, and inverse or time domain filtering in both data processing centers handling seismic data recorded on magnetic tape and in digital computers. These methods tend to become unweildly and costly, and none have been found by the geophysical industry to be completely satisfactory. Only one, or only a few channels of data can be processed at one time by the aforementioned methods. Several hundred channels can be handled simultaneously by optical means.

The spectrum of data of the type described has bright spots along the vertical axis indicating points of concentration of the data, both of reflections and of ringing, positioned outwardly from the center of the spectrum in accordance with the characteristic frequencies of each. Separate spots will indicate concentrations of data at certain frequencies such as a low frequency (corresponding originally to about 25 cycles per second), and intermediate frequency (30 to 35 c.p.s.) and a higher frequency (45 to 50 c.p.s.). From an inspection of the original data available to the seismic interpreter it is evident that the ringing tends to be of the higher frequency, over 45 c.p.s., and that it interferes with or obscures the genuine reflections, which are of the lower frequencies. It, therefore, appears that the higher frequencies should be masked or filtered out.

Two opposed blunt needles placed as shown in FIGURE 24 may be vertically positioned to effect this filtering which tends to remove all horizontal or close to horizontal lines of frequencies above 45 cycles per second from the original seismic data shown in FIGURE 27. If there is no ringing at any angle appreciably different from the horizontal, then it is not necessary to remove any of the higher frequency data other than that at or near the horizontal.

The desired filtered data can then be reconstructed into an image with the high frequency ringing attenuated or removed and the lower frequency genuine reflections enhanced.

Calibration of the coordinates in the spectrum plane, so that bright spots can be related to actual frequencies of seismic events in cycles per second, is readily achieved by taking advantage of certain data on the objective transparency. Such data can include time scales with marks every .01 second (i.e., 100 c.p.s. information) and the vertical channels between individual data traces. Their spatial frequency on the objective, which in turn corresponds to a precise seismic frequency, is such that it results in spots in the diffraction plane at measurable intervals corresponding to the spatial frequency.

Sometimes it is not possible to identify types of interference on a seismic section. It is then desirable to "clean up" the data by removing various types of data, one at a time. In each case the filtered section can be studied by an experienced seismologist, who can apply to it conventional interpretive criteria to determine better the nature of the enhanced data remaining behind. The enhancement may make it possible to discover that particular alignments represent genuine reflections, multiples, diffractions, etc., and to use this information in exploring for oil. It is in many instances extremely difficult and expensive to effect the kind of filtering discussed here by electronic or other means presently known to the geophysical industry.

For example, an unprocessed image of an unusual seismic section may have alignments in both directions, some at angles of dip which are relatively common in the region where the section was obtained. It may be felt that some of the information shown does not correspond to genuine reflections, not only because of the unusual dips, but particularly because it is physically very difficult for genuine alignment in two very different directions to be recorded over any large portions of the same area. It is then possible that some of the data represents anomalous and undesirable events such as diffractions, reflected refractions, and multiple reflections, but there is so much interference between the different kinds of data that it is difficult to study any of it in detail.

This presents a problem common in the geophysical industry, and in this case the original data may be filtered directionally several times, each time to remove alignments with different orientations, for example, recreating the resulting filtered image when right slopes are removed, next recreating the image after removing the steeper leftward dips, and last recreating the image after removing the milder or intermediate left dips.

It will thus be seen that in analyzing data obtained from the earth which can be in the form of seismic data, geophysical data or geological data, it is possible to put all of the superposed data on a transparency which when observed in and of itself may have no particular message for the geophysicist; but when placed in a two-idmensional optical filter system, it is possible to set up an observable transform or spectrum plane wherein the general arrangement of the light pattern on the transform and the position of the light density maxima relative to the center, as well as the angle of location relative to axes, will permit the determination of the existence, orientation and frequency of data which makes up the original transparency. As described above, this data can be analyzed and selectively filtered to provide additional information to the geophysicist in the form of reconstructed images which are readily observable.

It has been found that the above-described method may be utilized in many areas of geophysical work. The elimination of what is known as "ringing" is possible by utilizing notch frequency filters to reject a single narrow band of frequencies rather than all the high or all the low frequencies. In a similar way, as above described, the rejection of noise events such as air waves, ground roll, and other modes of traveling noise, as well as the elimination of generalized noise by frequency or directional filters or both, is possible. In refraction prospecting, the directional filtering system can be used to reduce or attenuate cycles with the same move-out as the first breaks which interfere with secondary arrivals, thus permitting an enhanced image of the secondary events for inspection and analysis.

The same system can be used for the removal of diffractions which cross reflections and tend to interrupt their continuity and otherwise cause interference. This permits a clearer analysis of basic reflections. In tectonic areas, the system can be used to separate the dips of reflections from opposite limbs of synclines which, in a composite transparency, tend to cross one another and confuse interpretation. In the far north or similar areas where there are apt to be permafrost bursts which obscure reflections, it is possible by simultaneous directional filtering in two directions to obtain a clearer view of the reflections uncomplicated by the perma-frost interference. Thus, in addition to the initial analysis of frequency and direction of superposed signals making up the transparency, it is also possible with basic geophysical knowledge to eliminate undesirable delineations and enhance those that are sought for further study.

We claim:

1. A method of processing seismic data to isolate information on stratification of the earth which comprises, recording waves reflected from such stratification, such waves being generated by a series of energy sources spaced at intervals along a line at the earth's surface, incorporating the signals from these reflected waves on a transparency to create a series of seismic signals delineated by light and dark lines, utiliizng said transparency as a diffraction source in a two-dimensional optical system, utilizing a spatial filter in said optical system to suppress components having unwanted frequencies and unwanted directions of alignment in the transparency on which the seismic signals are recorded in said system, and reconstructing the diffraction plane into an image carrying components having the frequencies and directions which remain subsequent to filtering.

2. A method of treating seismic data in which seismic data is recorded on a transparency which comprises processing said transparency in a two-dimensional optical filter to obtain a transform of the seismic data in a spectrum plane, and utilizing adjustable filter masks to remove unwanted directions and frequencies from said transform.

3. A method as defined in claim 2 in which a transform diffraction pattern is magnified in a transform plane and filtering patterns are disposed at said plane and manipulated to remove unwanted frequencies after which the resulting image from said transform diffraction pattern is reconstructed and enlarged to a final filtered image.

4. A method as defined in claim 2 in which a transform diffraction pattern is magnified in a spectrum plane and filtering patterns are disposed at said spectrum plane and manipulated to remove lines of unwanted orientations after which the resulting image from said diffraction pattern is reconstructed and enlarged to a final filtered image.

5. A method as defined in claim 2 in which a transform diffraction pattern is magnified in a spectrum plane, and filtering patterns are disposed at said spectrum plane in positions to block out spots of unwanted frequencies resulting from ringing, and reconstructing the resulting image from said diffraction pattern after filtering.

6. A method for removing multiple reflections from seismic data, in which seismic data is recorded on a transparency, which comprises processing said transparency in a two-dimensional optical filter to obtain a transform of the seismic data in a spectrum plane, utilizing orientational filtering patterns in said spectrum plane to remove the multiple reflections, and reconstructing the resulting image from said spectrum plane after filtering.

7. A method for removing undesired noise events from seismic data, which comprises recording all the seismic data on a transparency, processing said transparency in a two-dimensional optical filter to obtain a magnified diffraction pattern in a spectrum plane, using frequency and orientational filtering patterns in said spectrum plane to remove undesired noise events identifiable as air waves, ground roll and other travelling noises, and reconstructing the resulting image from said diffraction pattern.

8. A method for treating seismic data obtained by ground impactor and vibrator work to remove surface and air waves not removable by ordinary compositing which comprises recording said data on a transparency, processing said data in a two-dimensional optical filter to obtain a magnified diffraction pattern in a spectrum plane, disposing filtering patterns in said plane to remove lines corresponding to the frequencies and orientations of said surface and air waves, and reconstructing the resulting image to a final filtered image.

9. A method for treating seismic data to remove seismic diffractions which cross reflections and cause interference which comprises recording the data on a transparency, processing the transparency in a two-dimensional optical filter to obtain a diffraction pattern in a spectrum plane, using filtering patterns in said plane to remove lines corresponding to the orientations of the diffractions, and reconstructing the filtered diffractions pattern to a final filtered image.

10. A method for treating seismic data in which seismic refraction data is recorded on a transparency, which comprises processing said transparency in a two-dimensional optical filter to obtain a spectrum transform, magnifying the resulting diffraction pattern in a spectrum plane, interposing filtering patterns at said plane and manipulating said patterns to remove lines corresponding to the orientations of the primary refraction breaks and cycles following them with similar orientations, and reconstructing the resulting image to a final filtered image in which previously obscured secondary refraction events are enhanced.

11. A method for treating seismic data to clarify interpretation thereof by separating dips obtained in seismic prospecting from opposite limbs of synclines, which dips tend to cross one another and to confuse interpretation, which comprises recording said data on a transparency, processing the transparencies in a two-dimensional optical filter to obtaining a diffraction pattern in a spectrum plane, utilizing filtering patterns in said plane to remove all the lines corresponding to the dips from one limb of the syncline, utilizing filtering patterns in said plane to remove all the lines corresponding to the dips from the other limb of the syncline, and reconstructing the filtered data to final filtered images subsequent to each filtering operation.

12. A method of analyzing seismic data in which such data is recorded on a transparency, which comprises processing said transparency in a two-dimensional optical filter to establish an observable transform of the data in a spectrum plane, and utilizing the spectrum of the data to determine the existence, orientation, and frequency of data on said transparency from the relationships in the spectrum plane of light density from angular position relative to and distance outward from axes at the center of the spectrum.

13. A method of analyzing seismic data in which such data is recorded on a transparency, which comprises processing said transparency in a two-dimensional optical filter to establish an observable transform of the data in a spectrum plane, and utilizing the spectrum of the data to determine the existence and frequency of superposed data on said transparency from the relationship in the spectrum plane of light density to distance outward from the center of the spectrum.

14. A method of analyzing seismic data in which such data is recorded on a transparency, which comprises processing said transparency in a two-dimensional optical filter to establish an observable transform of the data in a spectrum plane, and utilizing the spectrum of the data to determine the existence and orientation of superposed data on said transparency from the relationship in the spectrum plane of light density to angular position relative to axes at the center of the spectrum.

15. A method for the statistical analysis of seismic data in which such data is recorded on a transparency, which comprises processing said transparency in a two-dimensional optical filter to establish an observable transform of the data in a spectrum plane, and examining the diffraction pattern in the spectrum plane to determine preferred alignments from the angles of light density maxima from the vertical or horizontal.

16. A method of treating seismic data which comprises recording data in a corrected multi-trace record, reducing said record to have a line density to lie in a range to serve as a diffraction objective in a two-dimensional optical system and placing said reduced record on a transparency, processing said transparency in a two-dimensional optical filter system to obtain a transform of the seismic data in a spectrum plane, and examining said spectrum plane to determine existence, orientation, and frequency of superposed data on said transparency.

17. A method as defined in claim 16 in which filtering patterns are disposed at the spectrum plane to block out unwanted lines at predetermined orientation and frequency, and reconstructing the spectrum into an image plane to enhance remaining data in that record.

18. A method of obtaining and processing seismic data to assist in the mapping of geological features associated with the accumulation of oil, gas or minerals in the subsurface formations of the earth which comprises:
   (a) generating seismic waves at a point near the surface of the earth by a sudden release of energy,
   (b) recording reflections, refractions and diffractions of those waves from interfaces of geological strata in a multi-trace record,
   (c) combining these records in a record section with a time-depth ordinate and an earth-surface distance abscissa,
   (d) transforming said record into an optical transparency, and
   (e) establishing a two-dimensional Fourier transform diffraction spectrum of the transparency to permit analysis of orientation and frequency of wave recordings thereon.

19. A method of obtaining and processing seismic data to assist in the mapping of geological features associated with the accumulation of oil, gas or minerals in the subsurface formations of the earth which comprises:
   (a) generating seismic waves at a point near the surface of the earth by a sudden release of energy,
   (b) recording reflections, refractions and diffractions of those waves from interfaces of geological strata in a multi-trace record,
   (c) combining these records in a record section with a time-depth ordinate and an earth-surface distance abscissa,
   (d) transforming said record into an optical transparency,
   (e) establishing a two-dimensional Fourier transform diffraction spectrum of the transparency to permit analysis of orientation and frequency of wave recordings thereon,
   (f) successively masking out selected frequencies and orientations of the original data in said diffraction spectrum by placing selected filter masks at said transform spectrum, and
   (g) reconstructing the filtered spectrum into an observable image of a record section omitting the filtered data to permit comparison with the original transparency.

20. A method of obtaining and processing seismic data to assist in the mapping of geological features associated with the accumulation of oil, gas or minerals in the subsurface formations of the earth which comprises:
   (a) generating seismic waves at a point near the surface of the earth by a sudden release of energy,
   (b) recording reflections, refractions and diffractions of those waves from interfaces of geological strata in a multi-trace record,
   (c) combining these records in a record section with a time-depth ordinate and an earth-surface distance abscissa,
   (d) transforming said record into an optical transparency,
   (e) establishing a two-dimensional Fourier transform diffraction spectrum of the transparency to permit analysis of orientation and frequency of wave recordings thereon,
   (f) masking out selected higher frequency concentrations in the diffraction spectrum to remove data due to ringing, and
   (g) reconstructing the filtered spectrum into an observable image of a record section omitting the filtered data to permit comparison with the original transparency.

21. A method of obtaining and processing seismic data to assist in the mapping of geological features associated with the accumulation of oil, gas or minerals in the subsurface formations of the earth which comprises:
   (a) generating seismic waves at a point near the surface of the earth by a sudden release of energy,
   (b) recording reflections, refractions and diffractions of those waves from interfaces of geological strata in a multi-trace record,
   (c) combining these records in a record section with a time-depth ordinate and an earth-surface distance abscissa,
   (d) transforming said record into an optical transparency,
   (e) establishing a two-dimensional Fourier transform diffraction spectrum of the transparency to permit analysis of orientation and frequency of wave recordings thereon,
   (f) masking out direct reflection frequencies and orientations in the diffraction spectrum to have residual data created by undesired recorded data, and
   (g) reconstructing the filtered spectrum into an observable image of a record section omitting the filtered data to permit analysis of the residual data.

22. A method of obtaining and processing seismic data to assist in the mapping of geological features associated with the accumulation of oil, gas or minerals in the subsurface formations of the earth which comprises:
   (a) generating seismic waves at a point near the surface of the earth by a sudden release of energy,
   (b) recording reflections, refractions and diffractions of those waves from interfaces of geological strata in a multi-trace record,
   (c) combining these records in a record section with a time-depth ordinate and an earth-surface distance abscissa,
   (d) transforming said record into an optical transparency,
   (e) establishing a two-dimensional Fourier transform diffraction spectrum of the transparency to permit analysis of orientation and frequency of wave recordings thereon,
   (f) masking out selected synclines in one direction of orientation in said diffraction spectrum by placing filter masks at said spectrum to block said selected synclines, and
   (g) reconstructing the filtered spectrum into an observable image of a section omitting the filtered data to enhance the remaining data on said transparency.

23. A method of obtaining and processing seismic data to assist in the mapping of geological features associated with the accumulation of oil, gas or minerals in the subsurface formations of the earth which comprises:
   (a) generating seismic waves at a point near the surface of the earth by a sudden release of energy,
   (b) recording reflections, refractions and diffractions of those waves from interfaces of geological strata in a multi-trace record,
   (c) combining these records in a record section with a time-depth ordinate and an earth-surface distance abscissa,
   (d) transforming said record into an optical transparency,
   (e) establishing a two-dimensional Fourier transform diffraction spectrum of the transparency to permit analysis of orientation and frequency of wave recordings thereon,
   (f) masking out selected synclines in a plurality of direction of orientation in said diffraction spectrum by placing filter masks at said spectrum to block said selected synclines, and
   (g) reconstructing the filtered spectrum into an observable image of a section omitting the filtered data to enhance the remaining data on said transparency.

References Cited

UNITED STATES PATENTS

| | | | |
|---|---|---|---|
| 2,696,891 | 12/1954 | Neufeld | 340—15.5 |
| 3,045,530 | 7/1962 | Tsujiuchi. | |
| 3,090,281 | 5/1963 | Marechal et al. | |
| 3,182,743 | 5/1965 | McCollum | 340—15.5 |
| 3,241,101 | 3/1966 | McNatt | 340—15.5 |
| 3,242,326 | 3/1966 | Cox | 340—15.5 X |
| 3,085,469 | 4/1963 | Carlson. | |
| 3,240,108 | 3/1966 | Lehan et al. | |

OTHER REFERENCES

Elias et al.: Fourier Treatment of Optical Processes, Journal of Optical Society of America, vol. 42, No. 2, February 1952, pp. 127–134.

Cutrona et al.: Filtering Operations Using Coherent Optics, Proceedings of the National Electronics Conference, vol. 15, Oct. 12–14, 1959, Chicago, Ill., pp. 1–14.

Jackson (I), Optical Analysis Techniques Applied to Seismic Data, Acoustics and Seismics Laboratory, Univ. of Michigan, January 1962, pp. 1–9.

Jackson (II), Optical Analysis Techniques Applied to Seismic Data, Acoustics and Seismics Laboratory, Univ. of Michigan, July 1962, pp. 3–18.

Jackson (III), Optical Analysis Techniques Applied to Seismic Data, Acoustics and Seismics Laboratory, Univ. of Michigan, January 1963, pp. 1–7.

Jackson (IV), Time Varying Spectra Through Optical Diffraction Scanning, Seismological Society of America, vol. 54, No. 2, April 1964, pp. 485–500.

Jackson (V), Analysis of Variable Density Seismograms by Means of Optical Diffraction, Geophysics, vol. 30, No. 1, pp. 5–20, February 1965.

BENJAMIN A. BORCHELT, *Primary Examiner.*

R. M. SKOLNIK, *Assistant Examiner.*